United States Patent Office 3,431,029
Patented Mar. 4, 1969

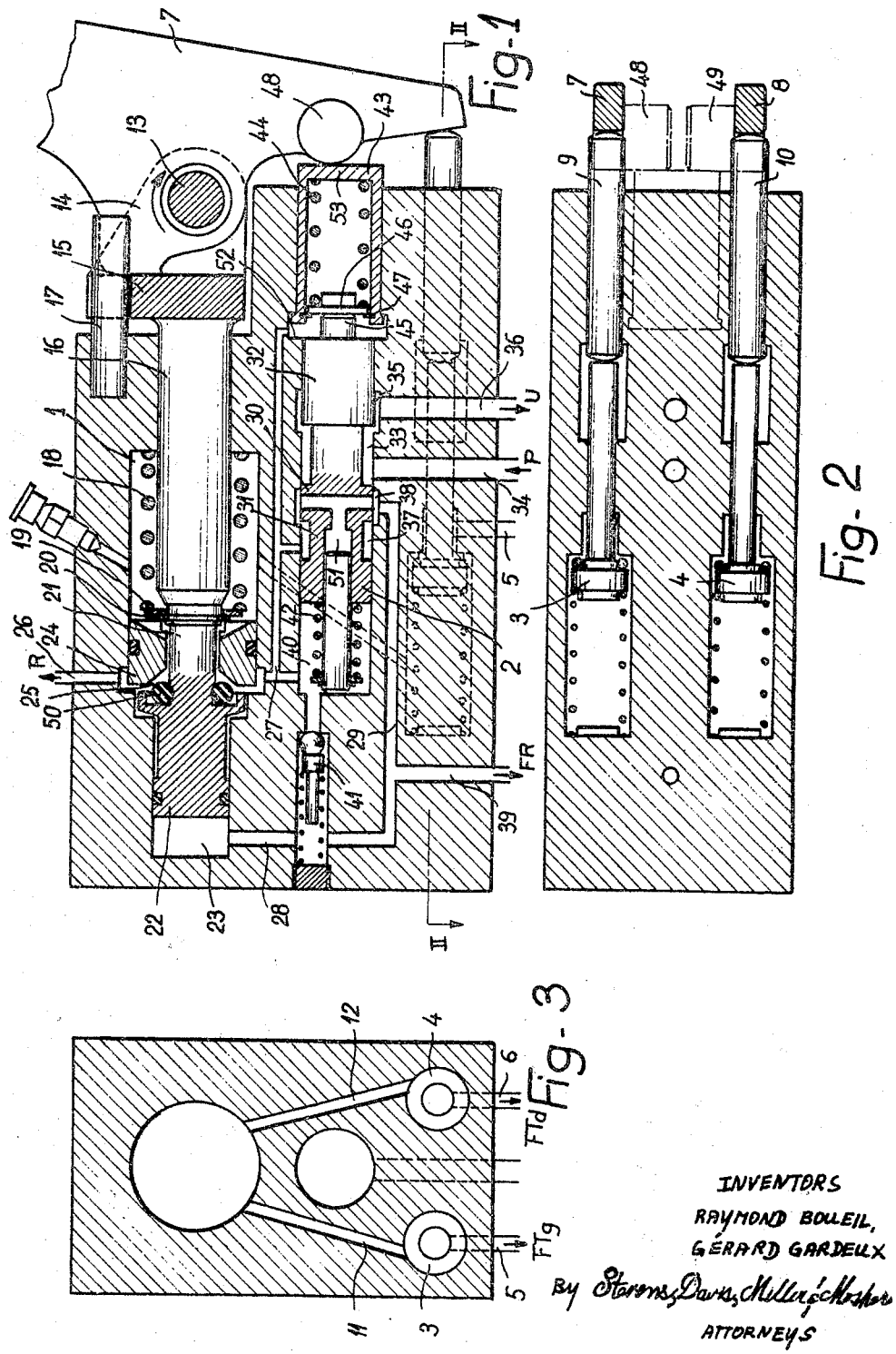

3,431,029
POWER-ASSISTED HYDROSTATIC BRAKING SYSTEMS FOR TRACTOR VEHICLES AND THEIR TRAILERS
Raymond Boueil and Gérard Gardeux, Billancourt, France, assignors to Regie Nationale des Usines Renault, Billancourt, Hauts-de-Seine, France
Filed Oct. 24, 1967, Ser. No. 677,573
Claims priority, application France, Nov. 24, 1966, 84,824
U.S. Cl. 303—7         8 Claims
Int. Cl. B65t 13/00; B60t 13/74, 13/16

ABSTRACT OF THE DISCLOSURE

A hydrostatic braking system wherein each brake pedal is solid with the movable member controlling the master cylinder delivering the hydrostatic fluid pressure and acts mechanically and simultaneously on said master cylinder and on the brake selector, and also on the servo-action distributor adapted to transmit to a piston of said master cylinder and if necessary to the braking system of the trailer, in the case of a tractor vehicle, a hydrodynamic pressure corresponding to the effort exerted on the brake pedal and permitting of maintaining in the brake cylinders a pressure proportional to said effort.

---

The present invention relates to systems for braking a tractor vehicle and possibly its trailer by means of a hydrostatic control device assisted by hydrodynamic control means connected to an open-center hydraulic circuit of the tractor which utilizes the hydrodynamic power output of the hydraulic power pump of the vehicle. This invention is concerned more particularly with a braking system having a priority characteristic in the operation of the general hydraulic circuit of the tractor vehicle but having no consequential action or effect on the operation of the other devices of the circuit, such as the retraction or lifting control device, and without being disturbed by the operation of these other devices.

Servo-action or power-assisted hydrostatic braking systems are already known, notably through the applicant's U.S. patent application Ser. No. 657,115 of July 31, 1967.

In this system the control members of the hydraulic circuit connected to the wheels of the vehicle, on the one hand, and a master cylinder delivering the hydrostatic braking pressure also acting upon a servo-action distributor, on the other hand, are actuated mechanically by the brake pedals; this system also uses a complementary brake fluid reserve.

It is the essential object of the present invention to provide a simplified and more compact device of this character wherein the aforesaid special fluid reserve can be dispensed with, and the hydraulic circuitry is simplified considerably. The device according to this invention which comprises a master cylinder adapted to deliver fluid at the hydrostatic braking pressure, a distributor connected on the one hand to said master cylinder so as to exert a servo-action thereon and to the braking circuit of the trailer, and on the other hand to the hydrodynamic circuit of the tractor, and a valved selector actuated by a pair of pedals for applying the tractor brakes unilaterally, is characterised in that each brake pedal is solid with the movable member controlling the master cylinder and exerts a simultaneous mechanical control action on said master cylinder and on the brake selector as well as on the servo-action distributor adapted to transmit to a piston of said master cylinder and if necessary to the trailer a hydrodynamic pressure corresponding to the effort exerted by the brake pedal and to maintain in the brake cylinders a pressure portional to said effort.

The advantageous features characterising this invention will appear more clearly as the following description proceeds with reference to the accompanying drawing illustrating diagrammatically by way of example a typical form of embodiment of the invention. In the drawing:

FIGURE 1 is an axial section showing a brake control unit according to this invention;

FIGURE 2 is a section taken along the line II—II of FIGURE 1, and

FIGURE 3 is a diagrammatic section taken across the device of FIGURE 1 and showing the connection between the master cylinder and the brake selector.

The device according to this invention comprises essentially in a single block or body a master cylinder 1, a servo-action distributor 2 and a brake selector. The latter comprises a pair of valves 3 and 4 adapted to communicate through ducts 5 and 6 respectively with the left hand brakes FTg and right hand brakes FTd of the tractor vehicle, whereby the driver can apply the brakes either of each tractor wheel separately or of both wheels simultaneously, with an equal fluid pressure in the brake cylinders of each wheel. To this end, the operative end of two brake pedals, a left-hand pedal 7 and a right-hand pedal 8, engage push rods 9 and 10 respectively controlling in turn the corresponding valves 3 and 4 communicating via ducts 11 and 12 with the master cylinder 1 as shown diagrammatically in FIGURE 3.

The brake pedals 7 and 8 are mounted for free pivotal movement on a pin or shaft 13 journalled in the arms 14 of an external strap 15 rigid with a cylindrical member 16 slidably mounted in a bore of the master cylinder 1, as shown.

A guide stud 17 projecting through the strap 15 assists in holding said member 16 and therefore the pedals 7, 8 in a proper angular position. The sliding member 16 is surrounded by a coil compression spring 18 prestressed by a washer 19 retained by a circlip 20 on the inner end of said member 16. Said inner end of sliding member 16 is rigid with the rod 21 of a piston 22 slidably mounted in turn in a chamber 23. Another piston 24 is adapted to slide in the master cylinder 1 along said rod 21. The master cylinder 1 communicates via an aperture 25 in piston 24 and a port 26 with the fluid reservoir R (not shown), via the ducts 11 and 12 with the valves 3 and 4 of the brake selector, and via another duct 27 with the servo-action distributor 2. This distributor also communicates via ducts 28 and 29 with chamber 23.

The distributor 2 comprises a slide valve 30 having two spools 31 and 32 separated by an annular groove 33 communicating via a duct 34 with the pump P of the open-center hydrodynamic circuit of the tractor. A chamber 35 in the distributor body enables the groove 33 to communicate with the duct 36 for discharging the fluid from said pump P to the load elements U of the tractor, for example the retraction or lifting control devices provided for lowering and lifting the farming equipments and tools, from which said fluid is returned to the reservoir R.

The spool 31 of slide valve 30 has an intermediate groove 37 communicating on the one hand via a duct 27 with the master cylinder 1 and through a chamber 38 and ducts 29, 39 with the braking system of a trailer, if one is coupled to the tractor vehicle. The end chamber 40 of this distributor communicates with said duct 27 and also with a spring-loaded ball valve 41 controlling the fluid communication via duct 28 with the chamber 23 of said master cylinder. A return spring 42 constantly urges the slide valve 32 to its inoperative position shown in the drawing. The push member 43 encloses a prestressed coil compression spring 44 bearing against a washer 46 retained by a circlip 47. The push member 43 engages stops 48 and 49 provided on the brake pedals 7 and 8 respectively.

When inoperative these pedals are positioned as shown in the drawing, the valves 3 and 4 of the selector device are open and the right-hand and left-hand brake cylinders FTd and FTg respectively communicate with the fluid reservoir through said valves and ducts 12 and 11, master cylinder 1, passage 25 in piston 24 and duct 26. Thus, the brake cylinders are at zero fluid pressure. The hydraulic fluid from the pressure pump P is fed via duct 34 to distributor 2 and flows subsequently through the groove 33 of slide valve spool 30 to chamber 35, and is eventually directed via duct 36 to the other hydraulic elements of the tractor before returning to the fluid reservoir R. The groove 33 is thus isolated from the braking circuit and therefore any pressure variations caused by the operation of the other hydraulic elements of the tractor cannot interfere with the brake applications.

When only one pedal is depressed, for instance the left-hand pedal 7, the latter will firstly move the pivot pin 13 together with the cylindrical sliding member 16 to the right, as seen in FIGURE 1, within the limits set by the prestressed antagonistic spring 18, and subsequently pivot about said pin 13 whereby the lower portion of the pedal will bear against the push-rod 9 to keep the valve 3 open. The right-hand pedal 8 rigid with the aforesaid pivot pin 13 remains in same relative position with respect to this axis and is also moved to the right, as seen in the figure, thus releasing its pressure against the push-rod 10 and closing the valve 4, whereby the communication between the master cylinder and the right-hand brake cylinder FTd is cut off. As a result, a brake application on the left-hand of the vehicle will have no influence whatsoever on the right-hand brake. Similarly, when the right-hand pedal is depressed, the left-hand brake FTg is not actuated.

On the other hand, if both brake pedals are depressed simultaneously, both valves 3 and 4 are kept open by the pivotal movement of the pedals and the two tractor brakes are caused to communicate via the ducts 11 and 12 with the master cylinder 1.

The movement of the cylindrical sliding member 16 to the right is attended by a movement in the same direction of the piston 22. This movement causes the passage 25 to be closed by the rubber O-ring or like seal 50 engaging the piston 24, so that this piston is moved to the right, as seen in the figure. Under these conditions, the fluid enclosed in the master cylinder 1 cannot escape to the reservoir R and its pressure rises. This hydrostatic pressure is directed through the ducts 11 and 12 and valve or valves 3, 4 (according as the driver depresses only one pedal or both pedals) to the brake cylinders FTg and FTd of the tractor so as to actuate these cylinders.

The operation of the hydraulic braking device is independent of the tractor hydraulic circuit fed from the pump P. In fact, should the engine or motor driving said pump stop for any reason, the tractor wheels would be normally braked as a consequence of the mechanical control action exerted by the brake pedal on the master cylinder and the selector device, without any power assistance.

In this case, the movement of sliding member 16 to the right is attended by an increment in the volumetric capacity of chamber 23. The ball valve 41 acting as a non-return valve permits the filling of this chamber with hydraulic fluid.

The action exerted by the driver's foot on the brake pedals 7 and/or 8, causes the pedals to pivot about the pin 13, and therefore the stops 48 and/or 49 to exert a pressure on the hollow push-rod 43 which, through the medium of the prestressed spring 44, moves the slide valve 30 of servo-action distributor 2 to the left, as seen in the drawing, and this slide valve movement is attended by the following effects:

(1) Cutting off the communication between chamber 38 and duct 27 leading from reservoir R;

(2) Opening the communication between said chamber 38 and groove 33 receiving the oil from pump P and (3) Throttling the fluid flow between said groove 33 and chamber 35.

This last effect is attended by a fluid pressure increment in groove 33, this pressure being communicated via chamber 38, ducts 29 and 28 to chamber 23 where it is applied to piston 22. The hydrodynamic pressure will thus assist the mechanical action exerted by the brake pedals on the sliding member 16 and on the piston 24 of the master cylinder. At the same time, the duct 39 may if desired direct this fluid pressure to the trailer brakes FR to apply same.

The same pressure is also transmitted to the inner chamber 51 of the spool 31 of slide valve 30 in distributor 2. The effect of this pressure on said slide valve 30 counteracts the force exerted by the pedals on the hollow push member 43; when these two forces are equal, the slide valve will be in a state of equilibrium.

To sum up, to a given effort exerted on the pedal and transmitted to said slide valve 30 there corresponds a predetermined pressure of the fluid acting upon the piston 22 and in the trailer brakes FR which is also transmitted to the inner chamber 51 of slide valve 30 to balance same in a position causing a fluid flow throttling action necessary for building up this pressure.

It is advantageous to limit the servo-action pressure applied to chamber 23 and to the trailer brakes FR. This is obtained by simply limiting the effort exerted on the slide valve 30 by the hollow push member 43. To this end, the permissible stroke of this hollow push member 43 is limited by the abutment of this member against the distributor body at 52. Under these conditions, only the force of spring 44 compressed between the washer 46 and the bottom 53 of said push member acts upon the slide valve 30. Therefore, the maximum value of the servo-action pressure is determined only by the force of spring 44 in its compressed condition, this spring being calculated accordingly.

When the brake pedals are released the spring 18 of master cylinder 1 moves the sliding member 16 to the left and, by restoring the passage 25 to the reservoir R, restores the communication between this reservoir and the brake cylinders, thus reducing the pressure to zero value. Simultaneously the action exerted by the return spring 42 on slide valve 30 moves the latter back to its initial inoperative position and the trailer brakes FR communicates with the fluid reservoir R.

If during a brake application the tractor hydraulic circuit is already under pressure due to the operation of another hydraulic device of the tractor, and as long as this pressure exceeds the value necessary for a brake application, the distributor 2 acts as a pressure-reducing device effective between the groove 33 and chamber 38. Thus, the distributor operates as follows: after the movement of slide valve 30 has isolated chamber 38 from reservoir R, and when the passage opens between the groove 33 and chamber 38, the pressure rises in this chamber and in the brake circuit (chamber 23 and trailer FR) and in chamber 51 of slide valve 30 until this pressure is sufficient to balance the effort exerted by the brake pedal or pedals on the hollow push member 43. At this time the communication established between groove 33 and chamber 38 is cut off and the fluid pressure in the brake cylinders is maintained at a value proportional to the effort exerted by the driver on the brake pedal but independently of the pressure then prevailing in the general circuit of the tractor vehicle.

In case the weaker pressure caused by the operation of another hydraulic device were not sufficient to produce an efficient brake application, the servo-action or assisting distributor will operate exactly as in the first case described hereinabove, with the sole difference that the loss of pressure caused by the throttling of the fluid passage between groove 33 and chamber 35 is not equal to the total pressure required for a brake application, but only to the difference between this braking pressure and the pressure then prevailing in the circuit to which this difference is added.

Although the present invention has been described in conjunction with a preferred embodiment, it is to be understood that modifications and variations may be resorted to without departing from the spirit and scope of the invention, as those skilled in the art will readily understand.

What is claimed is:

1. A power assisted hydrostatic braking system for a tractor vehicle and a trailer coupled thereto, comprising a master cylinder delivering hydrostatic braking pressure and communicating with a fluid reservoir, a servo-action distributor having a spring biased, two spool slide valve connected on the one hand to said master cylinder so as to exert a servo-action thereon and to the braking circuit of the trailer, and on the other hand to a hydrodynamic fluid circuit of the tractor comprising a fluid pump, and a selector comprising a pair of valves adapted to communicate with said master cylinder and with the tractor vehicle's brakes, a pair of brake pedals operatively connected to actuate said selector for applying the tractor brakes unilaterally, each brake pedal being solid with a movable control member controlling the master cylinder and exerting a simultaneous mechanical control action on said master cylinder, on the selector, and on the servo-action distributor adapted to transmit to a piston of said master cylinder and, if necessary, to the trailer a hydrodynamic pressure corresponding to the effort exerted on the brake pedal and to maintain in the brake cylinders a pressure proportional to said effort.

2. A power assisted hydrostatic braking system according to claim 1, in which said movable control member acting upon said master cylinder comprises a cylindrical member slidably mounted in a bore of said master cylinder and having an external strap provided with a pivot pin on which said brake pedals are pivotally mounted so as to be capable of pivoting when said pedals are selectively depressed, said cylindrical sliding member being responsive to the force of an antagonistic spring.

3. A power assisted hydrostatic braking system according to claim 2 in which said cylindrical sliding member is rigid with the rod of a piston of said master cylinder and adapted to exert thereon a servo-action hydrodynamic pressure transmitted by said distributor, and seal means in said distributor adapted to cut off communication between said master cylinder and the fluid reservoir of the hydraulic circuit.

4. A power assisted hydrostatic braking system according to claim 2 further comprising a guide rod, said external strap of said movable control member being adapted to slide on said guide rod.

5. A power assisted hydrostatic braking system according to claim 1 in which each brake pedal is adapted to actuate said servo-action distributor through the medium of a sliding push member acting upon said distributor slide valve by means of a compression spring disposed inside said push member.

6. A power assisted hydrostatic braking system according to claim 5 in which abutment means in the distributor body limit the permissible stroke of said push member.

7. A power assisted hydrostatic braking system according to claim 5 in which the servo-action pressure is determined by the force of the push-member spring in its compressed condition.

8. A power assisted hydrostatic braking system according to claim 1 further comprising a non-return valve interposed between said servo-action distributor and the chamber of the master cylinder in which said servo-action pressure is effective.

References Cited

UNITED STATES PATENTS

| 2,556,287 | 6/1951  | Milster      | 188—152  |
| 3,278,239 | 11/1966 | Klaus et al. | 303—5 X  |

FERGUS S. MIDDLETON, *Primary Examiner.*

JOHN J. McLAUGHLIN, JR., *Assistant Examiner.*

U.S. Cl. X.R.

60—52, 54.5; 188—152; 303—2, 10, 13, 53